United States Patent [19]

Price et al.

[11] Patent Number: 4,939,674

[45] Date of Patent: Jul. 3, 1990

[54] LABEL GENERATION APPARATUS

[75] Inventors: Macy J. Price, Golden, Colo.; Mario B. Accumanno, Cedar Grove, N.J.; Mack E. Johnson, Aruada; Norman J. Acker, Lakewood, both of Colo.

[73] Assignee: Engineered Data Products, Inc., Broomfield, Colo.

[21] Appl. No.: 185,141

[22] Filed: Apr. 22, 1988

[51] Int. Cl.5 .............................................. G09F 3/08
[52] U.S. Cl. ............................... 364/523; 101/93.4; 283/37; 283/81; 364/519
[58] Field of Search ................................... 364/518–520, 364/523; 283/81, 36, 37, 55, 60 R, 60 A, 903, 904; 101/66, 67, 70, 93.38, 93.39, 93.4; 156/DIG. 1, DIG. 24, DIG. 47

[56] References Cited

U.S. PATENT DOCUMENTS

| | | | |
|---|---|---|---|
| 3,804,007 | 4/1974 | Arciprete et al. | 101/66 |
| 3,921,516 | 11/1975 | Toft et al. | 101/66 |
| 4,264,396 | 4/1981 | Stewart | 101/67 X |
| 4,630,538 | 12/1986 | Cushman | 101/66 X |
| 4,658,366 | 4/1987 | Posh | 364/523 |
| 4,706,096 | 11/1987 | Sato | 101/66 X |
| 4,731,741 | 8/1988 | Allen | 364/518 |
| 4,807,177 | 2/1989 | Ward | 364/519 X |

Primary Examiner—Gary V. Harkcom
Assistant Examiner—H. R. Herndon
Attorney, Agent, or Firm—Dorr, Carson, Sloan & Peterson

[57] ABSTRACT

The label generation apparatus enables the user to define a label of arbitrary size, shape and characteristics. Each label in a series of labels includes unique indicia that individually identify each label according to any predefined sequence. The label generation apparatus includes a template generation capability that enables the user to define the basic label format having one or more writable indicia fields. These one or more writable indicia fields can be used to provide each label with individual identifying indicia according to any predetermined sequence. The label generation apparatus also includes an indicia generation capability that produces the individual identification according to various characteristics that are specified by the user of this apparatus.

63 Claims, 5 Drawing Sheets

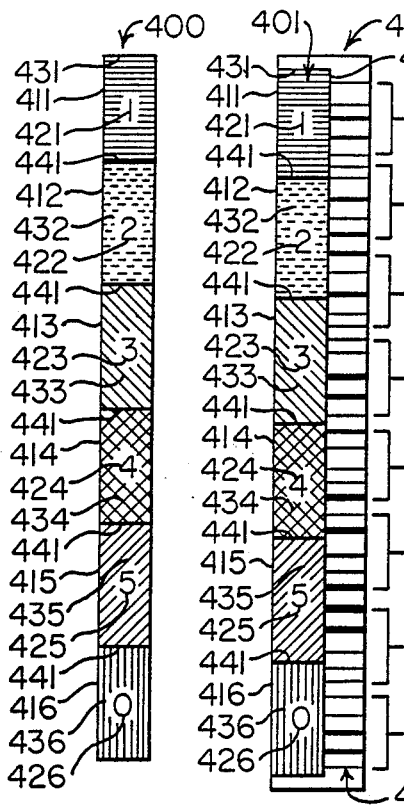
FIG. 4.　FIG. 5.
FIG. 6.
FIG. 7.
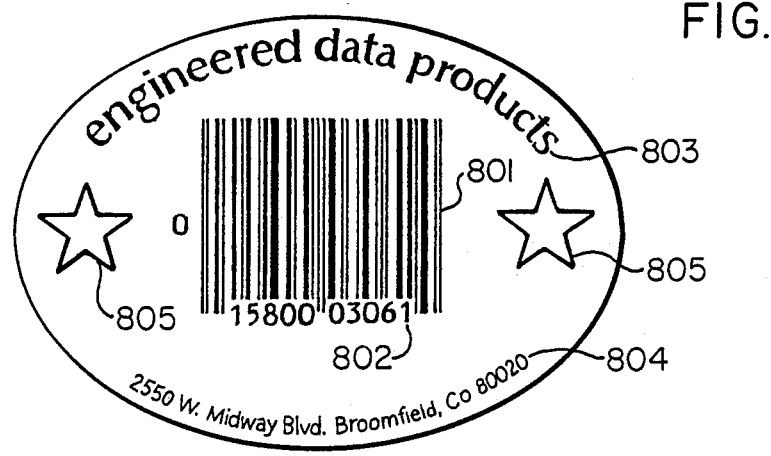
FIG. 8.

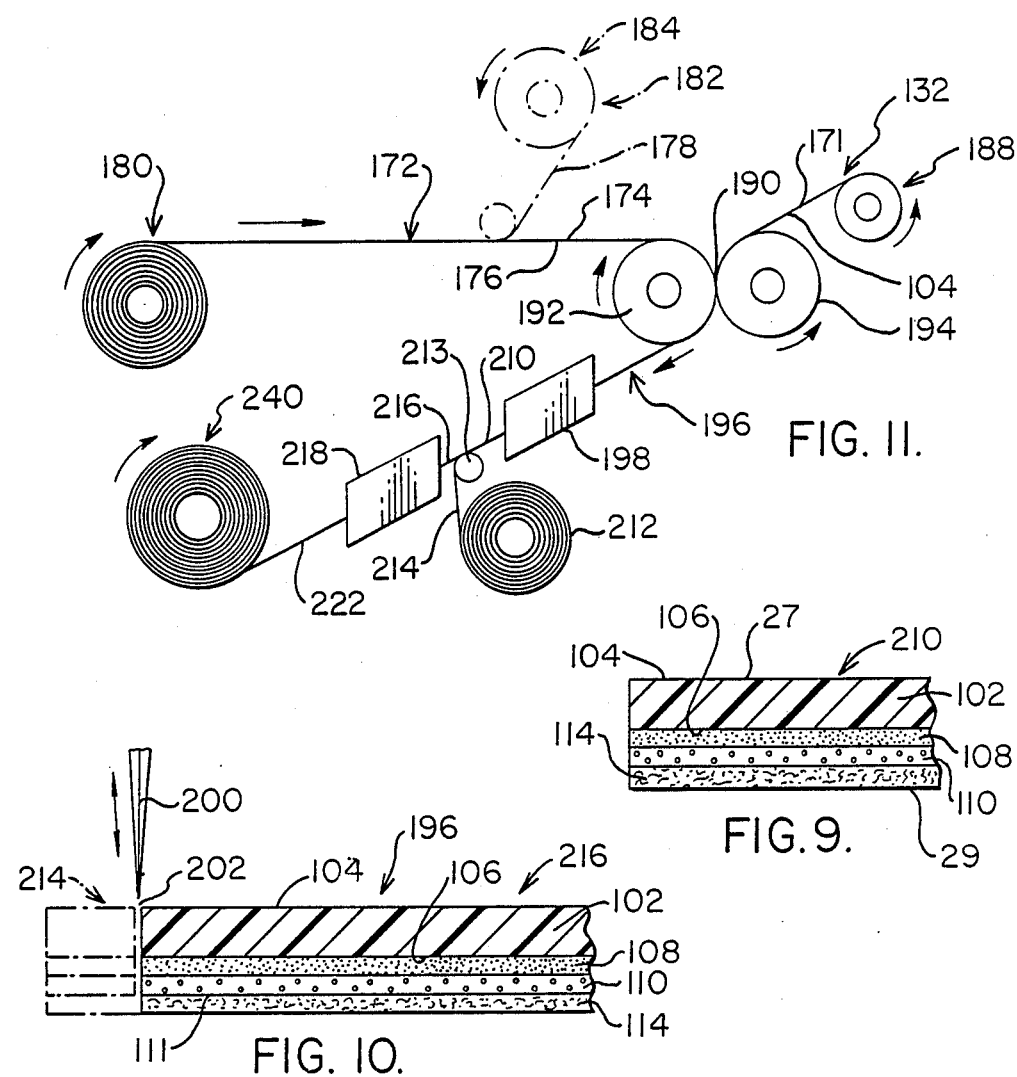
FIG. 11.
FIG. 9.
FIG. 10.
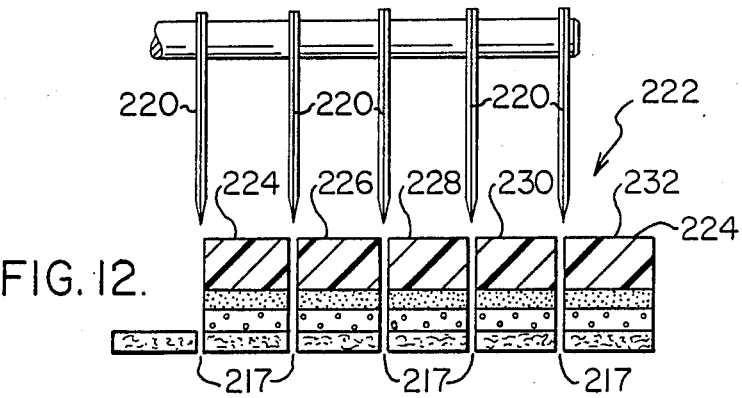
FIG. 12.

LABEL GENERATION APPARATUS

FIELD OF THE INVENTION

This invention relates to the creation of labels and, in particular, to apparatus for generating a series of labels each of which is individually identified by certain unique indicia printed thereon.

PROBLEM

It is a problem in the field of label making to inexpensively and efficiently produce labels that are individually identifiable. The art of label making can be classified into two categories. The first category is the generation of a large number of identical labels, such as that found on the vast majority of articles that are available for retain purchase. The generating of these identical labels requires the creation of a permanent printing master which is then used repetitively to generate identical labels in large numbers. The second type of label generation is the creation of a number of printed labels or documents that contain varying indicia printed thereon, where the variation in indicia is according to a well defined and commonly used numbering scheme. An example of this is the printing of checks or bank drafts where the series of checks are printed in sequential order according to a fixed numbering scheme. The generation of these printed documents requires the creation of a permanent or semi-permanent printing master that identifies the depositor and the depositor's account number, which information is printed on every check in the series. The varying indicia are the check numbers in the series, however this indicia is obtained by the use of a standard set of printing masters that are used for all similarly numbered checks printed by the bank. Thus, in this application, only a small number of permanent printing masters are required to be able to print all checks for all depositors since the numbering scheme typically runs from 100 to 9,999.

No where is there available apparatus for printing items with arbitrarily varying indicia according to any predetermined ordering. To accomplish this would require the generation of custom printing masters for each item that is to be printed. To accomplish this would require tremendous expense and is totally impractical using the printing systems that are presently available in the printing art.

SOLUTION

The above described problems are solved and a technical advance achieved in the field by the label generation apparatus of this invention that enables the user to define a label of arbitrary size, shape and characteristics, wherein each label in a series of labels includes unique indicia that individually identifies each label according to any predefined sequence.

The label generation apparatus includes a template generation capability that enables the user to define the basic label format having one or more writable indicia fields. These one or more writable indicia fields can be used to provide each label with individual identifying indicia according to any predetermined sequence.

The label generation apparatus also includes an indicia generation capability that produces the individual identification according to various characteristics that are specified by the user of this apparatus. The indicia can be alphanumeric characters, bar codes, colors, magnetically written codes, or any other writable indicia.

The user of the label generation apparatus specifies the type of indicia or combinations of the above listed indicia that are to be printed on the individual labels.

The user also specifies the ordering to be used in the generation of this indicia. This ordering can be any arbitrarily selected sequence, for example: indicia sequentially numbered according to any numbering system such as binary, decimal, hexidecimal; indicia ordered according to a series such as odd numbers, even numbers; indicia arbitrarily matched to a data file, such as printing a label for each employee according to their social security number; mixed mode indicia, such as printing one hundred sequentially numbered labels for each department in a corporate organization; or any other conceivable indicia ordering that is desired by the user. Once the scheme of ordering the indicia and the starting and ending indicia are defined by the user, the indicia generation apparatus generates data indicative of all of the indicia to be used in the series of labels that are to be printed. This data is then combined with template definition data to create a set of information that defines each label in the series of individually identified labels. This data is then used by the label generation apparatus to drive a printing mechanism to transfer the defined individually identified labels onto a label media.

One exemplary embodiment of this label generation apparatus is the use of a computer to generate the definition of the label template and the label indicia. The computer also combines this data to produce the final information that represents individually identified labels. The computer then drives a printing mechanism such as an electrostatic printer that produces the final labels on the label media. Additional equipment can be used to provide an adhesive backing to the labels so printed to thereby provide the user with individually identified labels in a form and format that is convenient for the particular application.

Thus, this apparatus produces individually identified items without the use of a permanent or semi-permanent printing master. The label generation apparatus generates labels of arbitrary size, shape, and configuration, as defined by the user and media used for the labels. These and other advantages of this apparatus are illustrated in the detailed description below.

BRIEF DESCRIPTION OF THE DRAWING

FIGS. 4 through 8 illustrate typical label configurations that can be generated using this apparatus;

FIG. 9 is a cross section view of a portion of a label;

FIG. 10 is a cross section view of a portion of a scored label stock;

FIG. 11 is a schematic view of apparatus used to produce rolled strips of label stock; and FIG. 12 illustrates a cross section view of a portion of stripped, slit label stock.

DETAILED DESCRIPTION

The label generation apparatus of this invention enables the user to define a label of arbitrary size, shape and characteristics, wherein each label in a series of labels includes unique indicia that individually identify each label according to any predefined sequence.

The label generation apparatus includes a template generation capability that enables the user to define the basic label format having one or more writable indicia fields. These one or more writable indicia fields can be used to provide each label with individual identifying indicia according to any predetermined sequence.

The label generation apparatus also includes an indicia generation capability that produces the individual identification according to various characteristics that are specified by the user of this apparatus. The indicia can be alphanumeric characters, bar codes, colors, magnetically written codes, or any other writable indicia. The user of the label generation apparatus specifies the type of indicia or combinations of the above listed indicia that are to be printed on the individual labels. The user also specifies the ordering to be used in the generation of this indicia. This ordering can be any arbitrarily selected sequence, for example: indicia sequentially numbered according to any numbering system such as binary, decimal, hexidecimal; indicia ordered according to a series such as odd numbers, even numbers; indicia arbitrarily matched to a data file, such as printing a label for each employee according to their social security number; mixed mode indicia, such as printing one hundred sequentially numbered labels for each department in a various corporate organization; or any other conceivable indicia ordering that is desired by the user. Once the scheme of ordering the indicia and the starting and ending indicia are defined by the user, the indicia generation apparatus generates data indicative of all of the indicia to be used in the series of labels that are to be printed. This data is then combined with template definition data to create a set of information that defines each label in the series of individually identified labels. This data is then used by the label generation apparatus to drive a printing mechanism to transfer the defined individually identified labels onto a label media.

One exemplary embodiment of this label generation apparatus is the use of a computer to generate the definition of the label template and the label indicia. The computer also combines this data to reduce the final information that represents individually identified labels. The computer then drives a printing mechanism such as an electrostatic printer that produces the final labels on the label media. Additional equipment can be used to provide an adhesive backing to the labels so printed to thereby provide the user with individually identified labels in a form and format that is convenient for the particular application.

System Architecture

Figure 1:
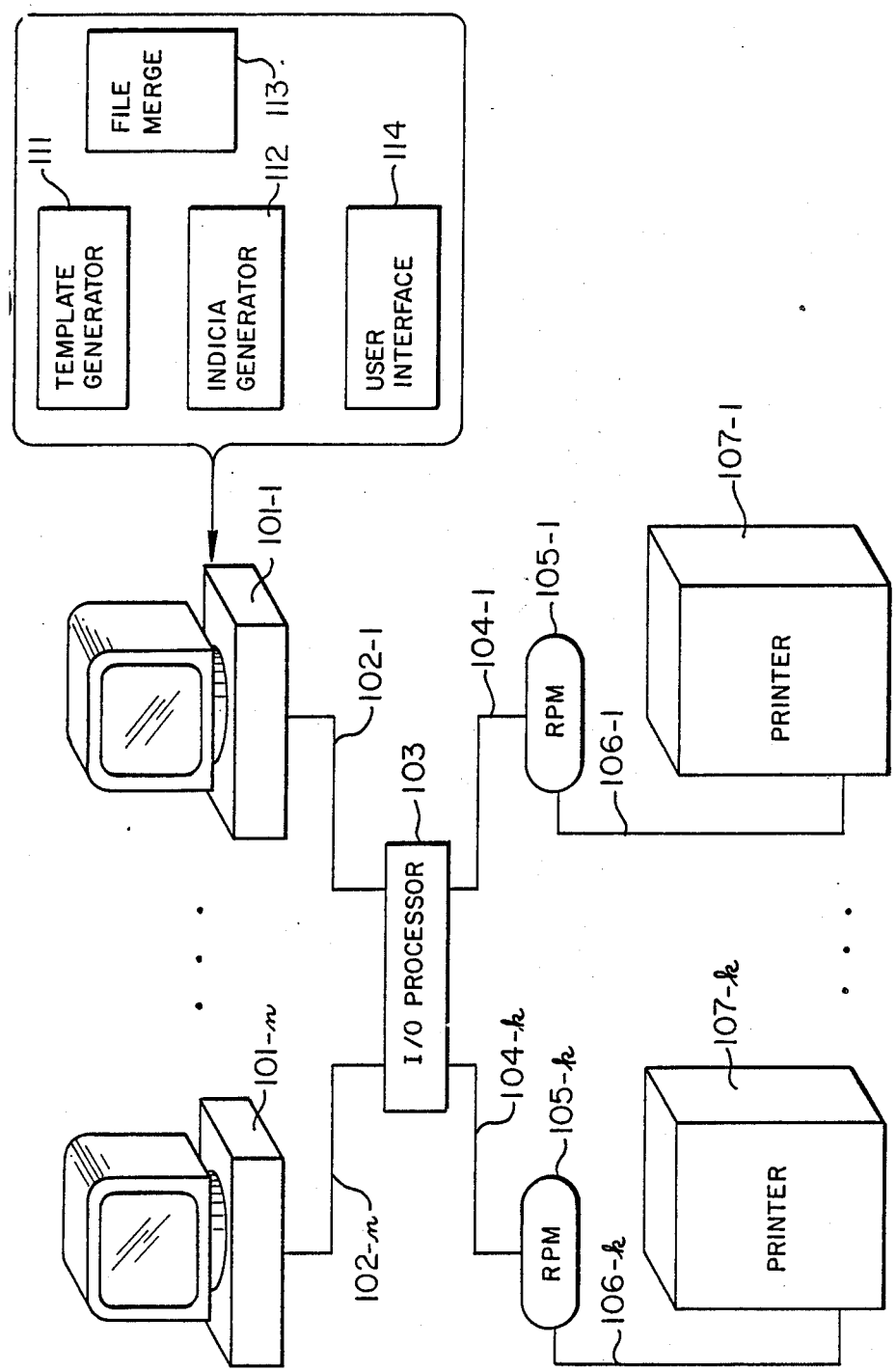
FIG. 1 illustrates in block diagram form the architecture of the label generation apparatus.

FIG. 1 illustrates the architecture of the preferred embodiment of the label generation apparatus in block diagram form. This label generation apparatus includes one or more processors (101-1 to 101-n), each of which is a small computer such as a commercially available personal computer. The plurality of processors (101-1 through 101-n) are each interconnected via an associated bus (102-1 to 102-n) to one or more input/output processors 103. The function of the input/output processor 103 is to act as a buffer to receive and temporarily store data files that are output by the one or more processors 101-1 to 101-n. These data files are output by input/output processor 103 over one of the one or more output bus leads 104-1 to 104-k. These output bus leads 104-1 to 104-k interconnect input/output processor 103 with one or more printers 107-1 to 107-k. Each printer illustrated in FIG. 1 is equipped with a raster processing machine 105-1 to 105-k that is interposed between the associated printer 107-1 to 107-k and the corresponding output bus lead 104-1 to 104-k. The function of the raster processing machine is to convert the data file that is down loaded from one of processors 101-1 to 101-n into a form and format that is usable by the associated printer 107-1 to 107-k. The raster processing machines 105-1 to 105-k can be stand alone units as illustrated in FIG. 1 or can be incorporated into the associated printer 107-1 to 107-k. The stand alone units are described herein for illustration purposes.

For example, processor 101-1 generates an output data file to control the operation of printer 107-k. Processor 101-1 transmits this output data file via bus 102-1 to input/output processor 103 where it is temporarily stored in a buffer. When printer 107-k is available to print the label definition data that is stored in this data file, input/output processor 103 transmits the data file in object code form via output data bus 104-k to raster processing machine 105-k that is associated with printer 107-k. Raster processing machine 105-k converts the object file into ASCII raster data that is used to drive the print mechanism in printer 107-k. The ASCII raster data is output a byte at a time by raster processing machine 105-k via control leads 106-k to printer 107-k to cause the printer 107-k to print the label definition data that is contained in the original data file that was transmitted by processor 101-1. In this preferred embodiment, the label generation apparatus is illustrated as including one or more processors 101-1 to 101-n and one or more printers 107-1 to 107-k. An alternative implementation is the use of a single processor and multiple printers or multiple processors and a single printer. Similarly, a single input/output processor 103 is illustrated in FIG. 1 while a plurality of these input/output processors may be used in a particular implementation. The selection of the numbers of the devices illustrated in FIG. 1 and their precise interconnection is a function largely of the capability of the devices selected. Thus, a powerful processor 101-1 can be used to drive a plurality of printers if the processor 101-1 can generate data files at a rate faster than a single printer can print the files. Therefore, depending on the throughput required of the label generation apparatus illustrated in FIG. 1, n processors can be used to drive k printers which are interconnected through one or more input/output processors 103. In some applications, input/output processor 103 can be dispensed with and a direct connection implemented between the one or more processors and the one or more printers. These are all implementation details that should not be construed to limit in any way the concept of the label generation apparatus described and claimed herein.

Printer

The term printer as used herein describes any of the various commercially available computer-driven systems that produce human readable and/or machine readable imprints on media. These systems include electrostatic plotters, laser printers, dot matrix printers, thermal printers, magnetic strip writers, magnetic ink character recognition (MICR) printers, and pen plotters.

One example of a state of the art printer that produces human readable output is the electrostatic plotter, such as Versatec ™ VS3000 plotter manufactured by Versatec, Inc. of Santa Clara, Calif. or the ColorWriter 400 plotter manufactured by Synergy Computer Graphics Corporation, of Sunnyvale, Calif. The electrostatic plotter uses four toner colors (black, cyan, magenta, yellow) to produce 2048 output colors. The plotter produces 400 pixels per inch onto the print media which typically is a 24", 36" or 44" by 200 foot roll of mylar. Other print media can be used, such as paper or other transparent materials. In addition, a sandwich or composite label can be produced, with the label printed on paper and overlayed with a protective transparent layer. The plotter includes a raster processing machine either as an integral part of the plotter or a separate stand-alone unit. The raster processing machine receives print data from the processor generating the label data via an RS232C serial interface. The raster processing machine accepts industry-standard data formats and rasterizes this data into printer control signals.

The plotter uses either a single or a multipass color plotting technique to ensure data registration accuracy. The multipass technique marks the media to end of plot in the first pass to assure proper registration. The media is then automatically rewound to plot starting position. Four passes, each writing one color from one of the four toner stations, overlay the four primary colors - black, cyan, magenta, and yellow. The plotter includes automatic precision tracking apparatus to maintain registration to better than one-half dot. This registration accuracy enables the user to define 2048 colors.

A printer such as the electrostatic plotter can produce colors, alphanumeric characters, bar codes that can be read by a human or a machine vision system. Thus, the electrostatic plotter can produce a wide spectrum of label formats and, for that reason, is described in the preferred embodiment. Other printer mechanisms can be used to produce magnetically readable indicia such as MICR printers, but are not described in detail herein.

Control Software - Template Generator

The remaining elements on FIG. 1 consist of the control routines 111–114 that are loaded in each of processors 101-1 to 101-n. These control routines are used to construct the database or data file that is used to drive the printer to produce the labels desired by the user. These control routines include user interface 114 which is a routine to interface the label generation apparatus in user friendly fashion with the user at the keyboard and display of one of the processors, for example processor 101-1. This user interface 114 can be menu driven software that permits the user to select the label format and define the label content as well as the number of labels to be produced by label generation apparatus. The data obtained through user interface 114 drives template generator 111 and indicia generator 112.

Template generator 111 produces a definition of the replicated part of the label. This replicated part of the label may include printed delimiters that are used to define various writable indicia fields. The indicia field delimiters may also be simply predefined areas on the label that are not separated by any printed delimiters. In addition, template generator 111 produces the standard invariant textual or visual information that is part of the standard label design. Template generator 111 can also produce registration marks (r on FIG. 3) that are used to indicate bench mark positions on the label media that is printed with one or more of the labels. The registration marks become important when entire sheets of labels are produced by the printer and these sheets of labels must be cut into individual labels. The registration marks provide alignment points which can be used by an automatic cutting device to accurately cut the labels according to a predetermined pattern. Another function of template generator 111 is to generate stop and start characters when the indicia to be printed on the label comprises a bar code in whole or in part. A typical bar code includes start and stop characters such as a dollar sign or an asterisk at the beginning and end of the bar code field. Since these characters are immutable from label to label, template generator 111 can produce these characters as part of the overall label template.

Template generator 111 can consist of the above described label template or can also include a sheet template (FIG. 3) that generates a plurality of the label templates to be printed on an entire sheet of label media by the printer. An example of such an arrangement is the printing of a sheet of labels consisting of a matrix of N by M labels arranged in linear fashion. Thus, the sheet template can replicate the individual label template into a pattern of N by M label templates and adds the appropriate registration marks r on to the sheet of labels that are to be printed. The definition provided by the user through user interface 114 indicates the configuration of labels that are to be printed by the printer.

Figure 3:
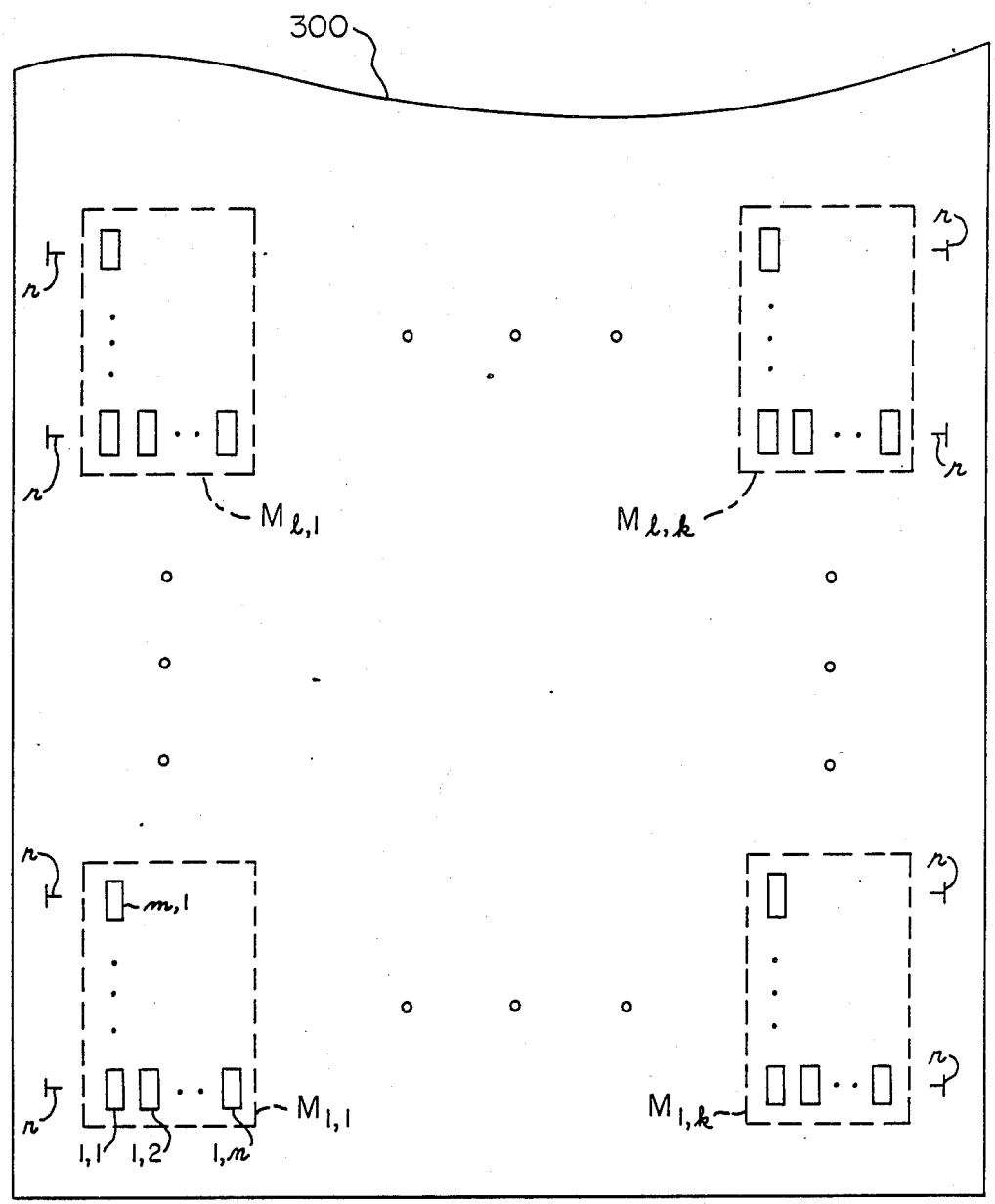
FIG. 3 illustrates a typical output format for a series of ordered labels.

A plurality of sheets of labels wherein each sheet consists of n by m labels can be designated by the user. FIG. 3 illustrates one sheet definition arrangement. A master block (ex-$M_{1,1}$) is defined as a matrix of m * n labels arranged in m rows of n labels each. The master block $M_{1,1}$ is itself replicated as the element in an 1 * k matrix. Thus, by this process, an array of N * M labels is defined where N=m * l and M=n * k. Furthermore, this sheet definition can be replicated sequentially any number of times along the length of the label media.

Template generator 111 is typically a library of standard label designs or formats that can be selected by the user. These label designs are produced, for example, by the use of a graphics software package that is included in template generator 111 on-line on one of processors 101-1 to 101-n or off-line on another processor (not shown) as a stand-alone unit. Such graphics software packages are well known and include the following commercially available packages: ISSCO, CATIA, CADRAM, UNIRAS, Precision Visuals, AutoCAD, SAS, D-Pict, PATRAN, Graphics Software Systems/CGI. The user generates the label template, including delimiters, textual and visual information as well as printing registration marks, using a graphics software package and stores this information in template generator 111 as a library routine that can be accessed for label generation purposes.

Control Software - Indicia Generator

Indicia generator 112 defines and generates the indicia that are produced for the writable indicia fields in the labels defined by template generator 111. The user via user interface 114 defines the type and character of the indicia to be produced, the ordering of the indicia from label to label and the starting and stopping points of the indicia. Thus, the labels produced by the label generation apparatus can be sequentially numbered, ordered according to a predefined series or matched to a database input by the user containing an arbitrary indicia listing. Indicia generator 112 produces the sequence of indicia via the use of program control instructions that define the ordered sequence selected by the user. The program control instructions typically are mathematical routines that define the sequence of indicia. As with the template definitions, the indicia sequences can be a library of standard software routines that are user-selectable or can be a user programmed sequence. Indicia generator 112 responds to the selection of the desired ordering as well as data input by the user through user interface 114 defining the form of the indicia to be used. The indicia consists of any sort of identification that can be printed on the label. This identification can be bar codes, alphanumeric codes, magnetic strips, color codes or any other sort of indicia that can be conceived.

Once the indicia form is defined, the user through user interface 114 defines the format of the indicia. The format can be the order that the indicia are printed in the writable indicia fields, the specific combination of indicia such as selecting either a single set of indicia or duplicate or redundant indicia. An example of redundant indicia is the case where a bar code is printed on the label, and adjacent to the bar code is written the numeric equivalent of the bar code characters. An alternative is the use of color coded indicia that are written into each of the writable indicia fields on top of which is written the corresponding alphanumeric character that matches the defined color coding. Similar arrangements can be used and are discussed below for MICR encoding, alphanumerics, color coding and bar coding. The user can also define the starting value of the indicia to be printed in the first label in the series of labels that are printed.

Once the various parameters defining the indicia are input to indicia generator 112 via user interface 114, indicia generator 112 generates the series of indicia that are used to individually identify all of the labels in the series of labels that are to be printed. Indicia generator 112 generates the first set of indicia based on the data input by the user through user interface 114 and then calculates the next indicia values based on the defined ordering provided by the user. The indicia values are calculated on a label by label basis and stored in a data file typically on a sheet by sheet basis. Once the data file defining the various indicia values is completed, the indicia values are converted into control signals corresponding to the form and format as well as the content of the indicia. File merge routine 113 combines the template generated by template generator 111 with the indicia information generated by indicia generator 112 into an object file which is stored in processor 101-1. This object file contains all of the data necessary to define all of the labels in the series of individually identified labels that are to be printed by the label generation apparatus.

The object file stored in processor 101-1 is downloaded over data link 102-1 to input/output processor 103 which is a slave buffer processor used to store the object files before they are printed by the designated printing device. Input/output processor 103 is a computer such as an 80286 based processor board which functions under the control of the one or more processors 101-1 to 101-n to transmit the object files to the one or more printers 107-1 to 107-k.

Input/output processor 103 stores object files to be output on the various ones of printers 107-1 to 107-k. The apparatus used to implement the printers 107-1 to 107-k are any secondary device that can be controlled by a computer. These devices include electrostatic plotters, laser printers, dot matrix printers, thermal printers, MICR printers, magnetic strip writers and any other such devices.

Label Generation Control Software

Each label consists generally of two sections: a human readable section, a machine readable section. The human readable section includes pictorial and written information that identify the item labeled as well as its source or origin. The pictorial information includes fanciful drawings and colored background areas to make the label more attractive to the user. The textural information provided on the label in human readable form is generally in the form of alphanumeric characters that identify the item that is labeled.

The machine readable section of the label generally consists of some indicia that can be read by a machine for pricing or object identification purposes. In the field of machine readable codes, the bar code is the most widely used and recognized form of machine readable codes and is utilized on numerous commercial articles. One bar code in particular, the universal product code (UPC), has gained widespread acceptance. The universal product code numbering system is described in the "UPC symbol specification" published by the Uniform Product Code Council, Inc., Dayton, Ohio, and is designed for use primarily with ten digit codes that can be expanded to longer codes. The standard symbol in this bar code is in the form of a series of parallel light and dark bars of different widths and a corresponding OCR-A or B numeric font equivalent which is referred to as the "bar code symbol". In a typical ten digit universal product code symbol, the symbol consists of a series of thirty (30) dark and twenty-nine (29) light parallel bars with a light margin on each side, each character or digit of the code being represented by two dark bars and two light spaces. The overall shape of the bar code is rectangular in nature, with each character being independent. The character is typically made up of seven data elements or modules which may be light or dark and the bar may be constructed from one to four dark modules. The universal product code also includes two characters beyond the ten needed to encode the universal product code. One character is a module check character and is embedded in the rightmost portion of the symbol to ensure a high level of reading for reliability. The second character is embedded in the leftmost position of the universal product code and shows which number system a particular symbol encodes.

The symbol size in the universal product code is infinitely variable in order to accommodate the ranges and quality achievable by various printing processes. That is, the size of the symbol can be uniformly magnified or reduced from a nominal without significantly affecting the degree to which it can be scanned. The universal product code symbol is also capable of preventing tampering. Unauthorized editions of lines to the preprinted symbol is readily detectable by conventional scanning devices. Similarly, poor printing will not result in the scanning devices reading a wrong number since the symbol has multiple error detecting features which allows scanner designers to build equipment to automatically detect and reject a very poorly printed symbol or one that has been tampered with. Such symbols also incorporate and present the code number in human readable form as the bar code symbol.

Many other forms of bar codes exist. For example, the code 39 or "3 of 9" bar code and the interweaved 2 of 5 code have achieved equal widespread application. Such codes, like the universal product code, consist of a plurality of light and dark parallel bars variously arranged to encode information with features to prevent tampering and account for poorly printed symbols. The 3 of 9 bar code also is capable of encoding alphabetical characters as well as numerical characters.

Another form of machine readable code is alphanumeric characters printed in an OCR format. These alphanumeric characters can be scanned by a vision system which translates any printed alphanumeric characters into data that is stored in a computer system. Another form of machine readable indicia is magnetic strips which are a pattern of magnetized and unmagnetized stripes that can be read by a magnetic sensor. The magnetic stripe reader is similar to the vision system bar code reader in function. Yet another form of machine readable code is the magnetic ink character recognition (MICR) system which uses an ink having a magnetic material therein to imprint machine readable magnetic indicia on a document.

Label Formats

FIGS. 4-8 illustrate various label formats wherein combinations of human and machine readable indicia are printed on a label. FIG. 4 illustrates a typical magnetic tape cartridge label 400 that is well known in the art. This label 400 consists of a rectangular shaped label contained a plurality of indicia fields 411-416 each of which is coded with a background color 431-436 and a alphanumeric character 421-426 printed therein. The color 431-436 and alphanumeric character 421-426 indicia uniquely identify each magnetic tape cartridge. Each indicia field 411-416 can be separated from an adjacent indicia field by the use of a delimiter or printing trap 441 that consists of a solid line but the use of such a printed delimiter is not required.

Another form of rectangular label is illustrated in FIG. 5. This label contains both human readable and machine readable indicia. A first vertical column 401 imprinted on label 400 is divided into a series of vertically aligned, rectangular segments 411-416, each of which are separated from a contiguous other by a printing trap consisting of a solid line 441. The rectangular segments are also separated from a second vertically aligned column 402 adjacent to and coextensive with the first vertical column 401 by another printing trap 442 consisting of a solid line. One character 421-426 of machine readable and human readable code (such as an optical character recognition code) is located within each rectangular segment 411-416 in the first column 401 thereby forming a message in a first code. The second vertical column 402 contains a single machine readable code such as an UPC bar code which consists of a message in the second code which is identical to the message formed in the first vertical column 401. Moreover, the backgrounds 431-436 of each of the rectangular segments 411-416 contained within the first vertical column 401 is suitably color coded to correspond to the respective data characters 421-426 contained therein thereby providing a message in a third code which is identical to the above described messages of the first and second codes. For example, the numeral "1" corresponds to the color blue, "2" corresponds to gray, "3" corresponds to green, "4" corresponds to orange, "5" corresponds to brown and, "0" corresponds to red. The bar code encoded on this label includes start and stop characters such "*" or "$".

FIG. 6 illustrates a typical bar code label that contains a rectangular shaped field of indicia containing a bar code 601 and the corresponding OCR characters 602. The bar code 601 and associated OCR characters 602 provide a unique human readable and machine readable identification of the object to which the label is affixed. No printed delimiters are used in this label to separate the bar code 601 from the OCR characters 602. In addition, no textual or visual information or background printing is illustrated in this label.

FIG. 7 illustrates another label application wherein a plurality of indicia fields are provided and these indicia fields are not only machine readable and human readable but the human readable characters are in a plurality of languages. The label illustrated in FIG. 7 contains a bar code 701, a corresponding set of OCR characters 702 and set of indicia in the arabic language 703. Thus, either a plurality of different indicia or the same indicia reproduced in a plurality of forms are writable on the label.

FIG. 8 illustrates an oval shaped label that contains a rectangular shaped field of indicia containing a bar code 801 and the corresponding OCR characters 802. The oval shaped label contains both fanciful 805 and information conveying areas 803, 804 that identify the source of the identified object to the user. In addition, the bar code 801 and OCR characters 802 provide a unique human and machine readable identification of the object to which the label is affixed. A typical application of such a label would be a standard commercially available product that is identified by the bar code 801 and OCR characters 802 for the purpose of scanning for inventory control to identify the quantity of the labeled objects that are stored in stock.

Label Generation Process

The difficulty with the existing label generation systems is that these systems can either generate a vast quantity of identical labels or a number of differently identified labels according to a well defined and commonly used numbering scheme. None of the existing systems can generate arbitrarily varying indicia according to any predetermining ordering for printing on labels to individually identify each label without using permanent or semi-permanent printing masters. The label generation apparatus of the present invention enables a user to define a label of arbitrary size, shape and characteristics, wherein each label in a series of labels includes unique indicia that individually identifies each label according to any predefined sequence in both human readable and machine readable form without using printing masters.

Figure 2:
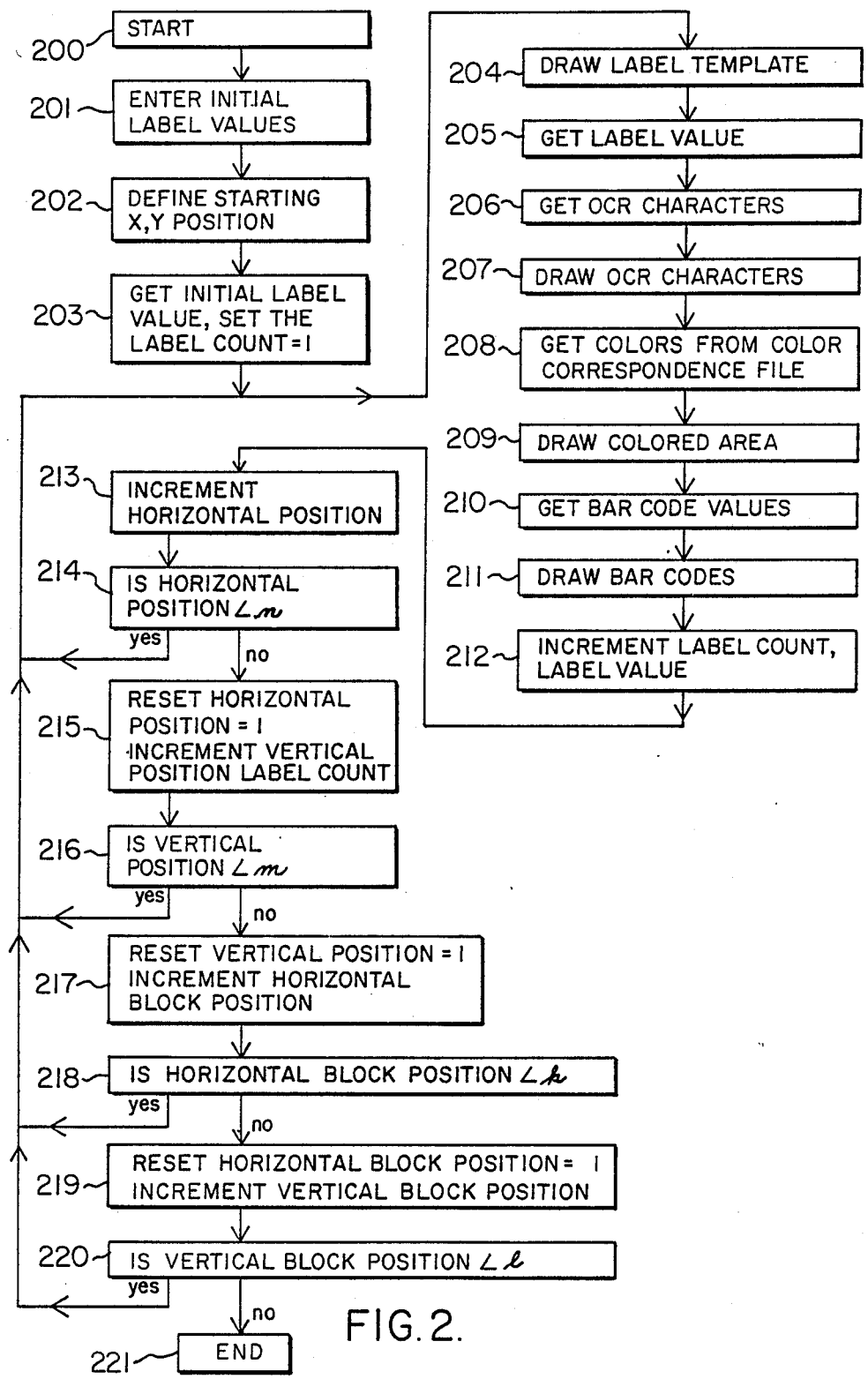
FIG. 2 illustrates in flow diagram form the overall functional structure of the label generation apparatus in flow, diagram form.

The label generation apparatus includes the control structure illustrated in FIGS. 2 and 3 in flow diagram form. The control structure of FIGS. 2 and 3 consists of a plurality of software routines resident on processor 101-1 to 101-n. In order to better understand the operation of the control structure illustrated in FIGS. 2 and 3, the generation of a plurality of the label illustrated in FIG. 5 is described. A sheet of label media is used to produce a matrix of n times m of the labels of FIG. 5. This matrix arrangement is illustrated in FIG. 3 wherein one sheet of the label media containing N times M labels are illustrated. The process of label generation begins at step 200 on FIG. 2. Processor 101-1 prompts the user at the associated keyboard at step 201 to enter initializing information to identify the label format, i.e.—the label of FIG. 5, as well as the initial value used for the indicia written on this label. The user at this step also inputs the final label value or the quantity of labels that are to be printed. It is assumed that there is a standard correspondence between the alphanumeric characters printed on the label and the color background printed in the indicia fields. If the user wishes to vary this standard correspondence, data can be entered at step 201 to redefine the correspondence in processor 101-1. Assume for the purpose of this description that the standard format and color/numeric correspondence is desired. At step 202, the user defines the starting x and y position coordinates of the label generation on the sheet of label media.

In response to the data entered by the user at steps 201 and 202, processor 101-1 retrieves the initial label value entered by the user and sets the label count variables equal to 1. Processing advances to step 204 where the label template is retrieved from the memory of processor 101-1. This label template consists of all of the standard non-indicia printing on the label. The label template includes the vertical and horizontal print traps that function as delimiters to identify each indicia field on the label. The label template also includes the start and stop characters in the bar code. Any other invariant printing on the label is also drawn at this point. For the purpose of this description, the term "draw" indicates the generation of the control information required to activate one of printers 107-1 to 107-k to actually print the identified information on the label media. In the multi processing environment illustrated in FIG. 1, the entire sheet of label media is typically drawn at the same time rather than on a label by label basis as processor 101-1 generates the control signals. Thus, the control process illustrated in FIGS. 2 and 3 result in the generation of a data file that consists of all of the control information required to activate one of printers 107-1 to 107-k to produce an entire sheet or collection of sheets of labels. Thus, at step 204 when processor 101-1 "draws" the label template for the first label in the series of labels, processor 101-1 stores the data indicative of the template in a data file associated with this print job.

File Merge

At step 205, processor 101-1 retrieves the present value of the label indicia which, in this case, is the initial label value input by the user at step 201. At step 206, processor 101-1 converts the present label value into a set of optical character recognition (OCR) characters. These characters are drawn at step 207 in the appropriate indicia fields in the label template. At step 208, processor 101-1 obtains the correspondence between the OCR generated characters and the background colors required for each of the indicia fields in which these OCR characters are printed. At step 209, processor 101-1 generates the control signals to activate the printer to draw the colored area fills for each of the indicia fields in the label. At step 210, processor 101-1 retrieves the bar code values corresponding to the generated OCR characters. At step 211 these bar codes are drawn in appropriate indicia fields in the label template. This step completes the generation of a single label including the label template, the OCR characters, color background indicia and bar codes.

Label Sequencing

Once the label is completed, processing advances to step 212 where processor 101-1 increments the label count, the horizontal position variable and the value of the label indicia. The label indicia can be numbered according to any predetermined ordering that is required by the user. This can be a sequential numbering, an ordered series, or correspondence to any input data file provided by the user. Thus, label count and label indicia value record are maintained separately by processor 101-1 since the label numbering may not be sequential and may not match the label count. Processor 101-1 must increment the label count at step 212 and generate the next label indicia value according to whatever predetermined ordering has been identified by the user. At step 213, processor 101-1 increments the horizontal position variable. At step 214, processor 101-1 compares the horizontal position variable with the defined maximum number of horizontal print positions for the particular sheet of label media to be printed. Thus, in the example of FIG. 8, a matrix of N times M labels are to printed on the sheet of label media. For the purpose of illustration, the number of labels on a master block $M_{1,1}$ of label media is five rows of twenty columns. Thus, at steps 213 and 214, the horizontal position count is incremented and compared with the delimiter of twenty to determine whether the entire row of twenty labels in the first block has been printed. If the entire row of twenty labels has not been printed, at step 214 processor 101-1 returns control to step 204 where another label in the sequence of labels is generated. The processing of steps 204 to 214 continues until an entire row of twenty labels has been printed. At this point, processing advances to step 215 where the vertical position count is incremented and at step 216 compared with the maximum value (which for this case is five). Thus, steps 213 and 214 generate a row of twenty labels while steps 215 and 216 generate five rows of twenty labels.

Once processing of this master block $M_1,^1$ of 100 labels in a 20×5 matrix has been completed, processing advances to step 217 where the vertical position variable is reset to 1 and the horizontal block position is incremented. At step 218, the horizontal block position is compared with the maximum value which in this case is 2. Similarly, steps 219 and 220 reset the horizontal block position to 1, increment the vertical block position and compare it with a maximum value which in this case is 5. Thus, steps 213–220 generate a matrix consisting of a master block of 100 labels in a 20 wide by 5 high configuration which master block is replicated twice horizontally and five times vertically on a sheet of label media to produce a series of 1,000 labels. This series can be of arbitrary length but for the purpose of illustration is indicated here to be a length of 1,000 which is a typical number that would be used. Once the entire 1,000 labels are printed using the control routine illustrated in FIGS. 2 and 3, processing advances to step 221 where the generation process is completed.

File Transmission

At this point, the entire data file consisting of the template and the label indicia information for all 1,000 labels is stored in processor 101-1. Since the series of labels is ready for printing, processor 101-1 transmits this data file to input/output processor 103 via bus 102-1 where the data file is stored until one of printers 107-1–107-k is available to print this data file. Assume for the purpose of discussion that printer 107-1 is available to print the data file. Input/output processor 103 transmits the data file over output bus 104-1 to raster processing machine 105-1 associated with printer 107-1. Raster processing machine 105-1 converts the data file that is downloaded from processor 101-1 via input/output processor 103 into a form and format that is usable by printer 107-1. Raster processing machine 105-1 converts the object file form of the data file into ASCII raster data that is used to drive the print mechanism in printer 107-1. The type of control information that is provided in the object file are control signals indicative of which pen in the plotter is to produce a particular segment of the label, pen up and pen down commands, and data indicative of the starting position length and direction of each line or character printed on the label.

Label Media

The labels produced by the label generation apparatus (for example FIG. 4) comprise an elongated rectangular shape base sheet member 102 (see FIG. 9) made of clear plastic material, such as Mylar, having a flat, smooth, glossy front surface 104 and a flat back surface 106 which has been chemically treated to enable electrostatic ink printing thereon as generally indicated by ink layer zone 108. The OCR alphanumeric characters 421-426 and corresponding colors 431-436 are reverse-printed with ink on the back surface 106 thereof in the printed ink zone 108 so as to be viewable in proper orientation through the front surface 104 thereof. Label graphics as they appear when viewed through front surface 104 are shown in FIG. 4, which is a front view of a back-printed plastic sheet. A layer of opaque adhesive material 110, FIG. 9, is fixedly adhered to the entire printed back surface 106 of the sheet member 102 in overlaying, covering relationship with the printed characters 421-426, and colors 431-436, thereon. Thus, unlinked portions (e.g. all of the spaces between the dark bars of the bar code alphanumeric characters in the second column 402 of FIG. 5) of the base sheet member material 102 appear to be the color of the opaque adhesive material 110 when viewed through the front surface 104 of base sheet member 102. The ink zone may have a single layer of ink, e.g. the black color bar code lines and the black color zone separating lines or multiple layers of ink where the black color alphanumeric indicia have a different color background overlay. A removable sheet 114 of backing material is removable adhered to the layer of opaque adhesive material 110, the backing material 114 being constructed of a substance such as treated paper which forms a weaker bond with the adhesive layer 110 than the plastic base member 102. Thus, the backing sheet is readily removable from the label prior to application of the label to a surface without removal of the adhesive layer 110 from the plastic layer 102.

Label Manufacturing Method and Apparatus

The present invention also comprises a method and apparatus for producing labels of the type described above. The apparatus for forming labels, in general, comprises an electrostatic printer 107-1, FIG. 1, and a laminator 179, FIG. 11. A continuous web of clear plastic sheet material 132 is provided in a selected width, e.g. 24 inches. The clear plastic web 132 is preferably a relatively stiff, high abrasion-resistant plastic material such as polyethylene terephthalate resin, which has been treated for electrostatic ink printing and is available commercially from the DuPont Company under the product name "Mylar". The plastic web preferably has a thickness of between 3 mils and 5 mils, and most preferably 4 mils.

The clear plastic web 132 is supplied to a conventional electrostatic printer 107-1. The electrostatic printer 107-1 is programmed to print reverse-image graphics and background colors on the web 128 corresponding to the graphics and colors of the label described above with reference to FIG. 1. In the preferred embodiment, the zone separation lines and alphanumeric and bar code images are printed first in black ink onto the back side of the plastic sheet material. Then the various background colors are selectively printed in the selected color inks onto the back side of the plastic sheet material over and around the alphanumeric ink images. The adhesive material preferably has a white color to provide maximum contrast with the black and other color ink.

As illustrated in FIG. 11, a laminating apparatus for forming rolled strip label stock may comprise an adhesive web unwind spool 180 which provides a continuous adhesive web 172. In an embodiment of the invention in which the adhesive web 172 is provided with two backing layers 176, 178, a second backing layer stripping assembly 182 is provided which strips off and collects second backing layer 178 on a backing layer collection spool 184. The adhesive web 172 positioned downstream of the backing layer stripping assembly 182 thus has an exposed adhesive layer 174 on the upper portion thereof and a backing layer 176 on the lower portion thereof. If a single-backed adhesive web 172 is used, the need for the second backing layer stripping assembly 182 is, of course, obviated. The apparatus also includes a back-printed plastic web supply means such as unwind spool 188. The printed back surface 171 of the plastic web (which corresponds to surface 106 of a subsequently-formed label) is positioned upwardly and unprinted surface 104 is positioned downwardly in the arrangement illustrated in FIG. 11. The adhesive web 172 and the back-printed plastic web 132 are both drawn into a laminating nip 190 formed by laminating rolls 192, 194 with the plastic web printed surface 171 being placed in contact with the exposed adhesive layer 174. The two webs are urged into compressive contact by the rolls to form a composite web 196, as illustrated generally in FIG. 9 prior to the occurrence of cut 200 (FIG. 10).

The composite web 196 initially passes through a scoring station 198 in which scoring blades 200, shown schematically in FIG. 10, provide a plurality of cuts 202. The knife 200 illustrated in FIG. 10 is shown raised above cut 202, but it will, of course, be understood that, during an actual cutting operation, the knife would be positioned within the area indicated by the cut 202. The cut 202 extends through the clear plastic layer 102 and adhesive layer 110, terminating at the interface 111 between the adhesive layer 110 and backing layer 114. A scored web 210, as shown in FIG. 10 including the areas shown in solid lines and in phantom lines, thus emerges from scoring station 198. A scrap web stripping means which may include a scrap windup spool 212 and an idler roll 213 is provided for stripping a continuous scrap web 214 from the scored web 210 to provide a stripped label stock web 216, as shown in FIG. 10 in solid lines only. The continuous scrap web 214, FIG. 10 in phantom, comprises the portions of plastic layer 102 and adhesive layer 100 other than the portions thereof associated with label graphics and none of the backing layer 114. The stripped label stock web 216 includes all of the continuous backing layer 14, the portion of plastic layer 102 which was back-printed with label graphics, and the portion of adhesive layer 110 directly underlying the portion of layer 102 with graphics printed thereon. The stripped label stock web 216 thus formed passes through a slitting station 218 whereat a plurality of slitting knives 220, FIG. 12, longitudinally slit the stripped label stock web 216 to from a slit label stock web 222 comprising a plurality of longitudinally-extending strips 224, 226, 228, 230, 232, etc., defined by cuts 217, which are each one label wide. The slit label stock web 222 is collected on a slit web windup spool 240, FIG. 11, and thus provides a plurality of rolls of label strip stock 224, 226, etc.

While a specific embodiment of this invention has been disclosed herein, it is expected that those skilled in the art can design other embodiments that differ from this particular embodiment but fall within the scope of the appended claims.

I claim:

1. Apparatus for automatically producing a series of labels, each label in said series of labels containing a set of indicia individual to said label and ordered according to a user defined ordering, comprising:
    means for defining a label template having one or more writable indicia fields;
    means for automatically generating a set of indicia for each of said labels in said series of labels, wherein each successive set of indicia in said series of labels is ordered according to a user defined ordering;
    means for color coding at least one of said indicia according to a predefined color to indicia correspondence;
    means for inserting each of said sets of indicia, individual to each label in said series of labels, and said color coding into said one or more indicia fields for each label in said series of labels; and
    means for automatically printing each of said individually identified labels in said series of labels on to label media.

2. The apparatus of claim 1 wherein said defining means includes:
    means for delimiting the boundaries of said indicia fields.

3. The apparatus of claim 2 wherein said defining means further includes:
    means for generating label media registration marks.

4. The apparatus of claim 1 wherein said generating means includes:
    means for replicating said sets of indicia to produce both a human readable and a machine readable set of indicia for each one of said labels in said series of labels.

5. The apparatus of claim 1 further including:
    means responsive to said inserting means for converting said label template and inserted indicia into printing control signals defining individually identified labels.

6. The apparatus of claim 5 further including:
    means for transmitting said printing control signals to said printing means.

7. The apparatus of claim 6 wherein said printing means includes:
    computer controlled printing apparatus for converting said printing control signals to printed indicia on said label media.

8. The apparatus of claim 1 further including:
    means for dividing said label media into individual labels.

9. A method of automatically producing a series of labels, each label containing indicia individual to said label, comprising the steps of:
    defining a label template having one or more writable indicia fields;
    automatically generating indicia, individual to each label in said series of labels, according to the user defined ordering;
    color coding at least one of said indicia according to a predefined color to indicia correspondence;
    inserting said generated indicia, individual to each label in said series of labels, and said color coding into said one or more indicia fields for each label in said series of labels; and
    automatically printing each of said individually identified labels in said series of labels on to label media.

10. The method of claim 9 wherein said step of defining includes the step of:
    delimiting the boundaries of said indicia fields.

11. The method of claim 10 wherein said step of defining further includes the step of:
    generating label media registration marks.

12. The method of claim 9 wherein said step of generating includes the step of:
    replicating said sets of indicia to produce both a human readable and a machine readable set of indicia for each one of said labels in said series of labels.

13. The method of claim 9 further including the step of:
    converting said label template and inserted indicia into printing control signals defining individually identified labels.

14. The apparatus of claim 13 further including:
    means for transmitting said printing control signals to said printing means.

15. The apparatus of claim 14 wherein said printing means includes:
    computer controlled printing apparatus for converting said printing control signals to printed indicia on said label media.

16. The apparatus of claim 9 further including:
    means for dividing said label media into individual labels.

17. Apparatus for automatically producing a series of labels, each label containing indicia individual to said label, comprising:
    means for defining a label template containing one or more writable indicia fields;
    means for automatically generating indicia for each of said indicia fields on each of said labels in said series according to a user defined label identification ordering to individually identify each label;
    means for combining said template and said generated indicia to produce a definition of a series of individually identified labels; and
    means for automatically printing said defined series of labels on label media.

18. The apparatus of claim 17 wherein said generating means produce alphanumeric indicia.

19. The apparatus of claim 17 wherein said generating means produces bar code indicia.

20. The apparatus of claim 17 wherein said generating means produces color coded indicia.

21. The apparatus of claim 17 wherein said generating means produces magnetic indicia.

22. The apparatus of claim 17 wherein said generating means includes:

means for generating first and second sets of indicia, said second set of indicia being a replication of said first set of indicia but in a different indicia form, for said indicia fields on each of said labels in said series according to said label identification ordering to individually identify each label.

23. The apparatus of claim 22 wherein said generating means produces both bar coded and alphanumeric indicia.

24. The apparatus of claim 22 wherein said generating means produces both color coded and alphanumeric indicia.

25. The apparatus of claim 22 wherein said generating means produces both bar coded and color coded indicia.

26. The apparatus of claim 22 wherein said generating means produces both magnetic and alphanumeric indicia.

27. The apparatus of claim 22 wherein said generating means produces both magnetic and color coded indicia.

28. The apparatus of claim 22 wherein said generating means produces both magnetic and bar coded indicia.

29. The apparatus of claim 22 wherein said combining means includes:

means for overlaying said first and said second sets of indicia.

30. The apparatus of claim 29 wherein said generating means produces both color coded and alphanumeric indicia.

31. The apparatus of claim 29 wherein said generating means produces both bar coded and color coded indicia.

32. The apparatus of claim 29 wherein said generating means produces both magnetic and alphanumeric indicia.

33. The apparatus of claim 29 wherein said generating means produces both magnetic and color coded indicia.

34. The apparatus of claim 29 wherein said generating means produces both magnetic and bar coded indicia.

35. The apparatus of claim 17 wherein said generating means includes:

means for generating indicia, in both machine readable and human readable form, for each of said indicia fields on each of said labels in said series according to said label identification ordering to individually identify each label.

36. The apparatus of claim 35 wherein said generating means produces both bar coded and alphanumeric indicia.

37. The apparatus of claim 35 wherein said generating means produces both color coded and alphanumeric indicia.

38. The apparatus of claim 35 wherein said generating means produces both bar coded and color coded indicia.

39. The apparatus of claim 35 wherein said generating means produces both magnetic and alphanumeric indicia.

40. The apparatus of claim 35 wherein said generating means produces both magnetic and color coded indicia.

41. The apparatus of claim 35 wherein said generating means produces both magnetic and bar coded indicia.

42. The apparatus of claim 35 wherein said generating means includes:

means for overlaying said human readable and said machine readable indicia.

43. The apparatus of claim 42 wherein said generating means produces both bar coded and alphanumeric indicia.

44. The apparatus of claim 42 wherein said generating means produces both color coded and alphanumeric indicia.

45. The apparatus of claim 42 wherein said generating means produces both bar coded and color coded indicia.

46. The apparatus of claim 42 wherein said generating means produces both magnetic and alphanumeric indicia.

47. The apparatus of claim 42 wherein said generating means produces both magnetic and color coded indicia.

48. The apparatus of claim 42 wherein said generating means produces both magnetic and bar coded indicia.

49. The apparatus of claim 17 wherein said generating means includes:

means for generating a plurality of sets of indicia, each of said sets of indicia being a replication of the other ones of said sets of indicia but in a different indicia form, for said indicia fields on each of said labels in said series according to said label identification ordering to individually identify each label.

50. The apparatus of claim 49 wherein said generating means produces bar coded, color coded and alphanumeric indicia.

51. The apparatus of claim 49 wherein said generating means produces bar coded, magnetic and alphanumeric indicia.

52. The apparatus of claim 49 wherein said generating means produces magnetic, color coded and alphanumeric indicia.

53. The apparatus of claim 49 wherein said generating means produces magnetic, color coded and bar coded indicia.

54. The apparatus of claim 17 wherein said generating means includes:

means for ordering said indicia in sequence from an initial indicia value to a final indicia value.

55. The apparatus of claim 17 wherein said generating means include:

means for ordering said indicia in series according to a predefined scheme.

56. The apparatus of claim 17 wherein said generating means includes:

means for ordering said indicia to match the data stored in an input data file.

57. The apparatus of claim 17 further including:

means for applying an adhesive backing to said label media.

58. Apparatus for automatically producing a series of labels, each containing indicia individual to said label, comprising:

means for defining a sheet template consisting of a matrix of n*m label templates, where $n>1$ and $m>1$, each containing one or more writable indicia fields;

means for automatically generating indicia for each of said indicia fields on each of said labels in said series according to a user defined label identification ordering to individually identify each label;

means for combining said sheet template and said generated indicia to produce a definition of a series of individually identified labels; and means for printing said defined series of labels on label media.

59. The apparatus of claim 58 wherein said generating means includes:

means for generating n*m sets of indicia, each of said sets of indicia corresponding to both human readable and machine readable entries in said indicia fields on one of said labels in said series, according to said label identification ordering to individually identify each label.

60. The apparatus of claim 58 wherein said generating means includes:

means for generating n*m sets of indicia, each of said sets of indicia corresponding to entries in said indicia fields on one of said labels in said series where said entries consist of two duplicate indicia in content but different in form, according to said label identification ordering to individually identify each label.

61. The apparatus of claim 58 wherein said generating means includes:

means for generating k* (n*m sets of indicia), each of said sets of indicia corresponding to entries in said indicia fields on one of said labels in said series, according to said label identification ordering to individually identify each label.

62. Apparatus for automatically producing a sequence of individually identified labels comprising:

means for defining a label set template comprising an n*m pattern of individual label templates, where n>1 and m>1, each of which includes k writable information fields;

means for generating an ordered sequence of n*m indicia, each of said n*m indicia consisting of k characters; and means for inserting the k characters of each successive one of said n*m indicia in the corresponding writable information fields of successive individual label templates.

63. Apparatus for automatically producing a series of labels, each label containing indicia individual to said label comprising:

one or more processor means, each of which includes:

means for defining a label template having one or more writale indicia fields;

means for automatically generally indicia for each of said indicia fields on each of said labels in said series according to a user defined label identification ordering to individually identify each label;

means for combining said label template and said generated indicia;

means for printing said combined template and indicia, including:

printer apparatus for printing labels on a label medium;

means for converting said combined template and indicia into printer control signals; and means for transmitting said printer control signals to said printer apparatus.

* * * * *

UNITED STATES PATENT AND TRADEMARK OFFICE
CERTIFICATE OF CORRECTION

PATENT NO. : 4,939,674

DATED : July 3, 1990

INVENTOR(S) : Macy J. Price; Mario B. Accumanno; Mack E. Johnson; Norman J. Acker It is certified that error appears in the above-indentified patent and that said Letters Patent is hereby corrected as shown below:

On the title page: Item [75]

Delete Macy J. Price as an inventor.

Signed and Sealed this

Twenty-fourth Day of October, 1995

Attest:

BRUCE LEHMAN

Attesting Officer            Commissioner of Patents and Trademarks

(12) REEXAMINATION CERTIFICATE (4831st)
United States Patent
Accumanno et al.

(10) Number: US 4,939,674 C1
(45) Certificate Issued: Aug. 19, 2003

(54) LABEL GENERATION APPARATUS

(75) Inventors: Mario B. Accumanno, Cedar Grove, NJ (US); Mack E. Johnson, Aruada, CO (US); Norman J. Acker, Lakewood, CO (US)

(73) Assignee: Engineered Data Products, Inc., Broomfield, CO (US)

Reexamination Request:
No. 90/005,316, Apr. 6, 1999

Reexamination Certificate for:
Patent No.: 4,939,674
Issued: Jul. 3, 1990
Appl. No.: 07/185,141
Filed: Apr. 22, 1988

Certificate of Correction issued Oct. 24, 1995.

(51) Int. Cl.⁷ .............................. G06F 15/00; G09F 3/08
(52) U.S. Cl. ..................... 358/1.9; 101/93.04; 101/93.4; 283/37; 283/81; 715/507; 715/520; 358/1.18
(58) Field of Search ................................. 358/1.18, 1.1, 358/1.9, 1.13, 1.16, 1.17; 707/500, 505, 517, 527, 507, 520; 101/93.04, 93.4; 283/37, 81

(56) References Cited

U.S. PATENT DOCUMENTS

| | | | |
|---|---|---|---|
| 3,081,698 A | 3/1963 | Childress et al. | 101/129 |
| 3,504,907 A | 4/1970 | Barber et al. | 270/1 |
| 3,667,382 A | 6/1972 | Kaplan | 101/19 |
| 3,804,007 A | 4/1974 | Arciprete et al. | 101/66 |
| 3,997,384 A | 12/1976 | Kuring et al. | 156/269 |
| 4,024,511 A * | 5/1977 | McJohnson | 358/1.7 |
| 4,063,641 A | 12/1977 | Kuehn et al. | 206/484 |
| 4,068,227 A | 1/1978 | Graham | 340/347 DD |
| 4,121,003 A | 10/1978 | Williams | 428/40 |
| 4,184,701 A | 1/1980 | Franklin et al. | 283/9 R |
| 4,204,639 A | 5/1980 | Barber et al. | 235/462 |
| 4,246,058 A | 1/1981 | Reed | 156/183 |
| 4,254,173 A | 3/1981 | Peer, Jr. | 428/204 |
| 4,254,409 A | 3/1981 | Busby | 340/731 |
| 4,329,191 A | 5/1982 | Barber | 156/64 |
| 4,515,487 A | 5/1985 | Minami | 400/121 |
| 4,523,776 A | 6/1985 | Barber | 283/39 |
| 4,525,237 A | 6/1985 | Clar | 156/540 |
| 4,568,403 A | 2/1986 | Egan | 156/247 |
| 4,623,418 A * | 11/1986 | Gombrich et al. | 358/1.12 |
| 4,651,278 A * | 3/1987 | Herzog et al. | 358/1.18 |
| 4,661,000 A * | 4/1987 | Shinbori | 358/1.18 |
| 4,661,001 A | 4/1987 | Takai et al. | 400/103 |
| 4,685,702 A | 8/1987 | Kazuharu | 283/81 |
| 4,712,929 A * | 12/1987 | Kitaoka | 358/1.18 |
| 4,769,110 A | 9/1988 | Ohno et al. | 156/350 |
| 4,807,177 A | 2/1989 | Ward | 364/900 |
| 4,809,220 A * | 2/1989 | Carlson et al. | 358/1.18 |
| 4,844,509 A | 7/1989 | Kasprzak et al. | 283/81 |
| 4,856,820 A | 8/1989 | Kasprzak et al. | 283/81 |
| 4,889,982 A | 12/1989 | Young et al. | 235/494 |
| 5,083,816 A | 1/1992 | Folga et al. | 283/81 |

FOREIGN PATENT DOCUMENTS

| | | |
|---|---|---|
| EP | 0 246 834 | 5/1987 |
| GB | 2077970 | 2/1981 |
| JP | 59-98229 | 6/1984 |

OTHER PUBLICATIONS

Markem Corp. brochure dated Mar. 1981 describing Scan-Mark 7000 Series reel–to–reel random label printer.
Markem Corp brochure dated Feb. 1983 describing Scan-Mark 7000 Series random label printer.

(List continued on next page.)

*Primary Examiner*—Gabriel Garcia

(57) ABSTRACT

The label generation apparatus enables the user to define a label of arbitrary size, shape and characteristics. Each label in a series of labels includes unique indicia that individually identify each label according to any predefined sequence. The label generation apparatus includes a template generation capability that enables the user to define the basic label format having one or more writable indicia fields. These one or more writable indicia fields can be used to provide each label with individual identifying indicia according to any predetermined sequence. The label generation apparatus also includes an indicia generation capability that produces the individual identification according to various characteristics that are specified by the user of this apparatus.

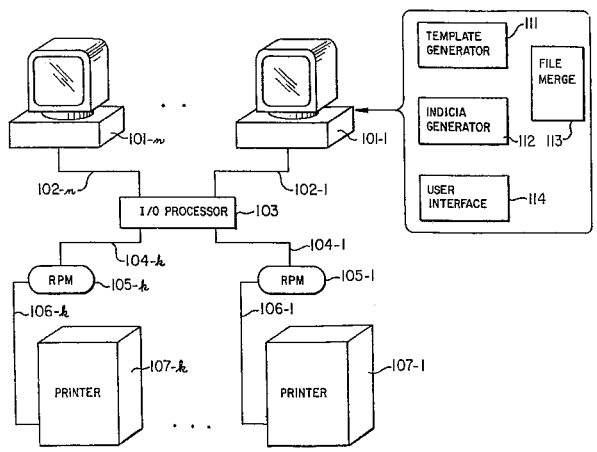

OTHER PUBLICATIONS

Markem Corp. brochure dated Mar. 1983 describing U–1230 random label printer.
TJ Software, Inc. brochure dated 1984 describing the Label Maker Software.
Operator's Guide dated 1986 describing the Label Maker software by TJ Software, Inc.
Silicon Press software Operator's Guide dated 1985 by Silicon Beach Software, Inc.
Silicon Press Addendum and Serializer On–Line help dated 1986 describing the Serializer accessory to the Silicon Press software by Western Software Technology.
WrightLine brochure dated Dec. 1986 describing the 4400 System.
Open Access manual dated 1984 by Software Products International (with translation).
Smart Datenbank software manual dated 1984–1987 by Innovative Software, Inc. (with translation).
HP Graphics Plotter brochure dated Mar. 1986.
ATC 20/20C Teleprinter and ATC MAGIC! Software Announcement dated Jun. 15, 1987.
The Print Production Handbook, Copyright 1985.
Memo from Analog Technology Corporation to ATC Customers and Resellers regarding relative operating costs of the ATC 8030 (Pentax Laser Engine) and the ATC 8220 Thermal Transfer Printer dated Aug. 14, 1990.
Analog Technology Corporation Brochure On–site printing and laminating of bar code labels.
Analog Technology Corporation brochure regarding the ATC 5000+—A PC–Based Printer Controller for Forms and Label Printing.
Analog Technology Corporation brochure regarding the ATC CodaJet—Bar Code and Forms Graphics in the HP LaserJet II.
Magic Mode Programming Introduction.
*Filing Dynamics developments in color coding for filing systems* by Barber and Lagemo, Marsdale Publishing Co. 1987.
Information sheet from TJ Software, Inc. regarding prices and system requirements for THE LABEL MAKER Version 2.0.
Bear Rock Price List (effective Feb. 1, 1987) and Information Sheet.
WRITEBAR installation instructions, copyright 1985, 1986, 1987 by Wilsoft, Inc.
TPS Electronics Product Information booklet.
Information regarding Check Out 5000, The Simple Solution to Tracking Out of File Records.
Brochure "CalComp ColorView Family" 1988.
Brochure on CalComp Plotters (ColorMaster Plotter/Printer) 1988.
Brochure on CalComp Plotters (CalComp ColorView Models 5912 and 5913 Thermal Transfer Plotter/Printers) 1988.
Brochure "CalComp's Own" regarding Quality plotter products and supplies 1989.
Brochure "The QMS" Magnum Series Controller: 1985.
Ads for Worthington Data Solutions in PC Magazine dated Jun. 23, 1987.
Information brochure on IBM 4079 Color Jetprinter by Lexmark.
*Color News* page with information on Canon BJC–800/BJC–820 (vol. 1, 1992).
Information brochure on Tektronix ColorQuick Ink–jet Printer (1989).
IBM Personal Printers by Lexmark Product Guide (1992).
Information brochure on Tektronix Color Printers (1991).
Zebra Technologies Corporation brochure on Product Service and Support Programs (Aug. 1994).
Zebra 14X Operator's Guide (copyright Zebra Technologies Corporation, 1991, 1992, 1993).
ZPL® Programming Guide for the Zebra Programming Language ® (40469LB Rev. 4, Copyright 1991–1993 Zebra Technologies Corporation).
QMS Printer Guide.
Memorandum from Bill Douglas/Bob Worsley of Tektronix responding to inquiry about Tektronix developer program and enclosing a brochure describing Tektronix printers (no date).
Zebra Technologies Corporation brochure on Zebra Training Program Catalog (Jan.–Jun. 1995) dated Nov. 1994.
Z–140 Release Notes for ZPL Version 8.7.1 to be used in conjunction with the Zebra Programming Language (ZPL®) version 8.x.x Programming Guide.
Anonymous, "Color Printing on the ATC 20/20C Thermal Transfer Printer: Addendum to the 20/20 Therman Transfer Print Operations Manual," Analog Technolgoy Corporation (Duarte, CA), (Jul. 1, 1988).
Anonymous, "Magic! Software for ATC printers and controllers," Data Absolute (Duarte, CA), (Aug. 1, 1990).
Anonymous, "Percon Reader," Percon (Eugene, OR), (Nov. 15, 1986).
Anonymous, "QMS Printer Guide," QMS (Mobile, Alabama).
Anonymous, "Zebra Training Program Catalog (Jan.–Jun. 1995)," Zebra Technologies Corporation (Vernon Hills, Illinois), pp. 1–4, (Nov. 1, 1994).
Anonymous, "Z–140 User Guide: Release Notes for ZPL Version 8.7.1".

\* cited by examiner

US 4,939,674 C1

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 17, 22, 24–28 and 41–48 are cancelled.

Claims 1, 9, 14–16, 18–21, 23, 29, 35, 49, 54–58, 62 and 63 are determined to be patentable as amended.

Claims 2–8, 10–13, 30–34, 36–40, 50–53, and 59–61, dependent on an amended claim, are determined to be patentable.

1. Apparatus for automatically producing a series of labels, each label in said series of labels containing a set of indicia individual to said label and ordered according to a user defined ordering, comprising:
   means for defining a label template having one or more writable indicia fields;
   means for automatically generating a set of indicia for each of said labels in said series of labels, wherein each successive set of indicia in said series of labels is ordered according to a user defined ordering;
   means for color coding at least one of said indicia according to a predefined color to indicia correspondence;
   means for inserting each of said sets of indicia, individual to each label in said series of labels, and said color coding into said one or more indicia fields for each label in said series of labels; and
   means for automatically printing each of said individually identified labels in said series of labels on to label media, *so that each of said individually identified labels includes color printing on said label media within one or more of said indicia fields according to the predefined color to indicia correspondence.*

9. A method of automatically producing a series of labels, each label containing indicia individual to said label, comprising the steps of:
   defining a label template having one or more writable indicia fields;
   automatically generating indicia, individual to each label in said series of labels, according to the user defined ordering[:];
   color coding at least one of said indicia according to a predefined color to indicia correspondence;
   inserting said generated indicia, individual to each label in said series of labels, and said color coding into said one or more indicia fields for each label in said series of labels; and
   automatically printing each of said individually identified labels in said series of labels on to label media, *so that each of said individually identified labels includes color printing on said label media within one or more of said indicia fields according to the predefined color to indicia correspondence.*

14. The [apparatus] *method* of claim 13 further including *the step of*:
   [means for] transmitting said printing control signals to [said printing means] *a printer.*

15. The [apparatus] *method* of claim 14 [wherein said printing means includes] *further including the step of*:
   [computer controlled printing apparatus for] converting said printing control signals to printed indicia on said label media.

16. The [apparatus] *method* claim 9 further including *the step of*:
   [means for] dividing said label media into individual labels.

18. The apparatus of claim [17] *20* wherein said generating means *further* produces alphanumeric indicia.

19. The apparatus of claim [17] *20* wherein said generating means *further* produces bar code indicia.

20. [The apparatus of claim 17] *Apparatus for automatically producing a series of labels, each label containing indicia individual to said label, comprising:*
   *means for defining a label template containing one or more writable indicia fields;*
   *means for automatically generating indicia for each of said indicia fields on each of said labels in said series according to a user defined label identification ordering to individually identify each label, wherein said generating means produces color coded indicia;*
   *means for combining said template and said generated indicia to produce a definition of a series of individually identified labels; and*
   *means for automatically printing said defined series of labels on label media so that printing said labels includes printing the color coded indicia.*

21. The apparatus of claim [17] *20* wherein said generating means *further* produces magnetic indicia.

23. The apparatus of claim [17] *20* wherein said generating means *further* produces both bar coded and alphanumeric indicia.

29. [The apparatus of claim 22 wherein said combining means includes] *Apparatus for automatically producing a series of labels, each label containing indicia individual to said label, comprising*:
   *means for defining a label template containing one or more writable indicia fields;*
   *means for automatically generating indicia for each of said indicia fields on each of said labels in said series according to a user defined label identification ordering to individually identify each label, comprising:*
   *means for generating first and second sets of indicia, said second set of indicia being a coded version of said first set of indicia but in a different indicia form;*
   *means for combining said template and said generated indicia to produce a definition of series of individually identified labels, comprising:*
   means for overlaying said first and said second sets of indicia; *and*
   *means for automatically printing said defined series of labels on label media so that printing said labels includes printing the overlaid first and second sets of indicia.*

35. The apparatus of claim [17] *29* wherein said [generating means includes:]
   means for generating indicia[, in both] *generates said first set of indicia in* machine readable *form and generates said second set of indicia in* human readable form, for each of said indicia fields on each of said labels in said series according to said label identification ordering to individually identify each label.

49. [The apparatus of claim 17 wherein said generating means includes] *Apparatus for automatically producing a series of labels, each label containing indicia individual to said label, comprising*:
   *means for defining a label template containing one or more writable indicia fields;*
   *means for automatically generating indicia for each of said indicia fields on each of said labels in said series according to a user defined label identification ordering to individually identify each label, comprising:*
      means for generating a plurality of sets of indicia, each of said sets of indicia being a [replication] *coded version* of the other ones of said sets of indicia but in a different indicia form, for said indicia fields on each of said labels in said series of labels in said series according to said label identification ordering to individually identify each label;
   *means for combining said template and said generated indicia to produce a definition of series of individually identified labels, comprising:*
      *means for overlaying at least two of said sets of indicia; and*
   *means for automatically printing said defined series of labels on label media so that printing said labels includes printing the overlaid sets of indicia.*

54. The apparatus of claim [17] *29* wherein said generating means includes:
   means for ordering said indicia in a sequence from an initial indicia value to a final indicia value.

55. The apparatus of claim [17] *29* wherein said generating means includes:
   means for ordering said indicia in a series according to a predefined scheme.

56. The apparatus of claim [17] *29* wherein said generating means includes:
   means for ordering said indicia to match the data stored in an input data file.

57. The apparatus of claim [17] *29* further including:
   means for applying an adhesive backing to said label media.

58. Apparatus for automatically producing a series of labels, each *label* containing indicia individual to said label, comprising:
   means for defining a sheet template consisting of a matrix of n*m label templates, where n>1 and m>1, each containing one or more writable indicia fields;
   means for automatically generating indicia for each of said indicia fields on each of said labels in said series according to a user defined label identification ordering to individually identify each label, *wherein said generating means produces color coded indicia*;
   means for combining said sheet template and said generated indicia to produce a definition of a series of individually identified labels; and
   means for *automatically* printing said defined series of labels on label media *so that printing said labels includes printing the color coded indicia.*

62. Apparatus for automatically producing a sequence of individually identified labels, comprising:
   means for defining a label set template comprising an n*m pattern of individual label templates, where n>1 and m>1, each of which includes k writable information fields;
   means for generating an ordered sequence of n*m indicia, each of said n*m indicia consisting of k characters, *wherein said generating means produces color coded indicia*; [and]
   means for inserting the k characters of each successive one of said n*m indicia in the corresponding writable information fields of successive individual label templates*; and*
   *means for automatically printing said sequence of individually identified labels on label media so that printing said labels includes printing the color coded indicia.*

63. Apparatus for automatically producing a series of labels, each label containing indicia individual to said label, comprising:
   one or more processor means, each of which includes:
      means for defining a label template having one or more writable indicia fields;
      means for automatically [generally] *generating* indicia for each of said indicia fields on each of said labels in said series according to a user defined label identification ordering to individually identify each label, *wherein said generating means produces color coded indicia*;
   means for combining said label template and said generated indicia;
   means for printing said combined template and indicia *so that printing said labels includes printing the color coded indicia*, including:
      printer apparatus for printing labels on a label medium;
      means for converting said combined template and indicia into printer control signals; and
      means for transmitting said printer control signals to said printer apparatus.

* * * * *